Aug. 10, 1954 R. H. GREEN 2,686,248
PAINT REMOVING TOOL
Filed Oct. 22, 1952 3 Sheets-Sheet 1
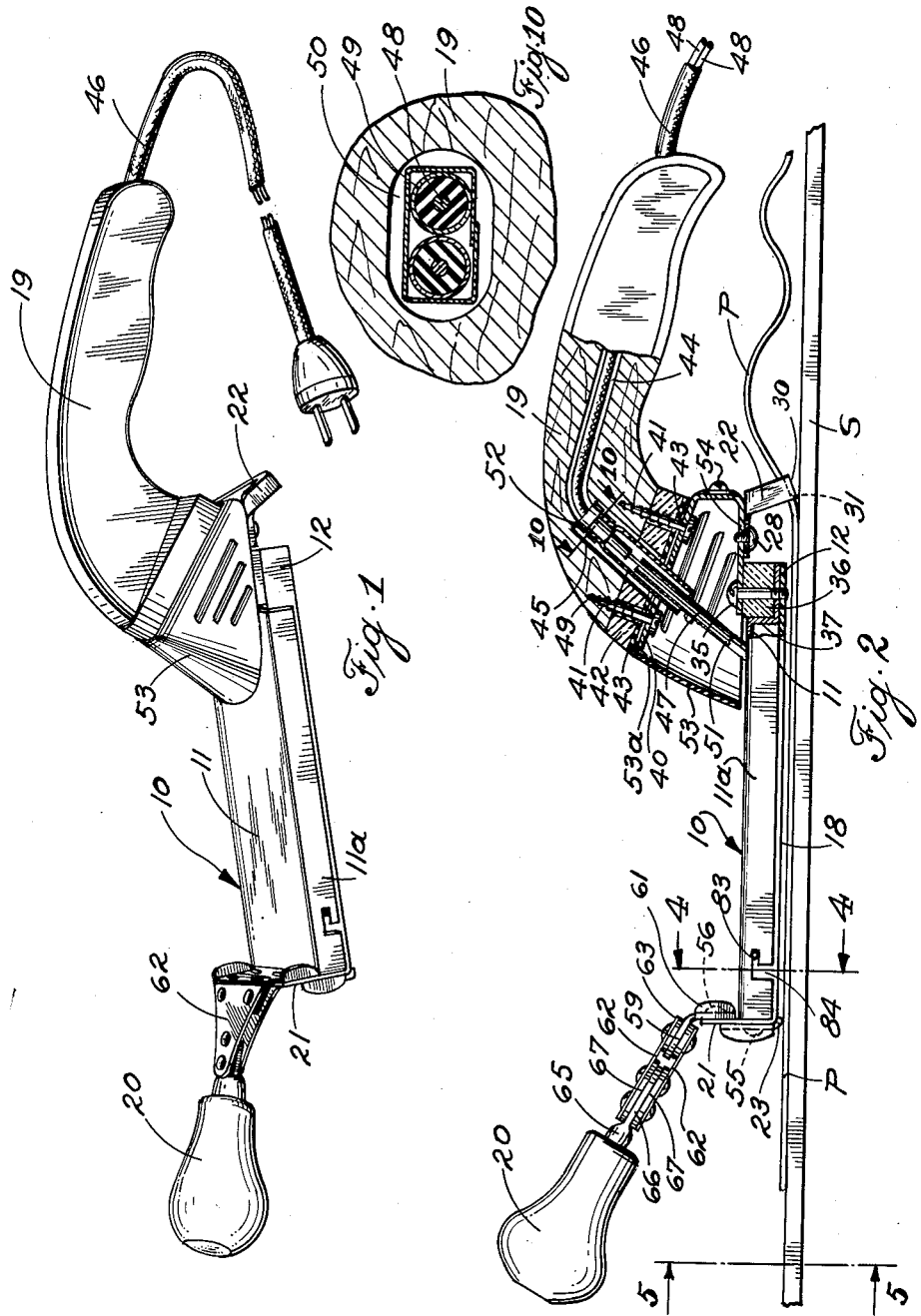
INVENTOR.
ROBERT H. GREEN
BY Bosworth + Sessions
ATTORNEYS

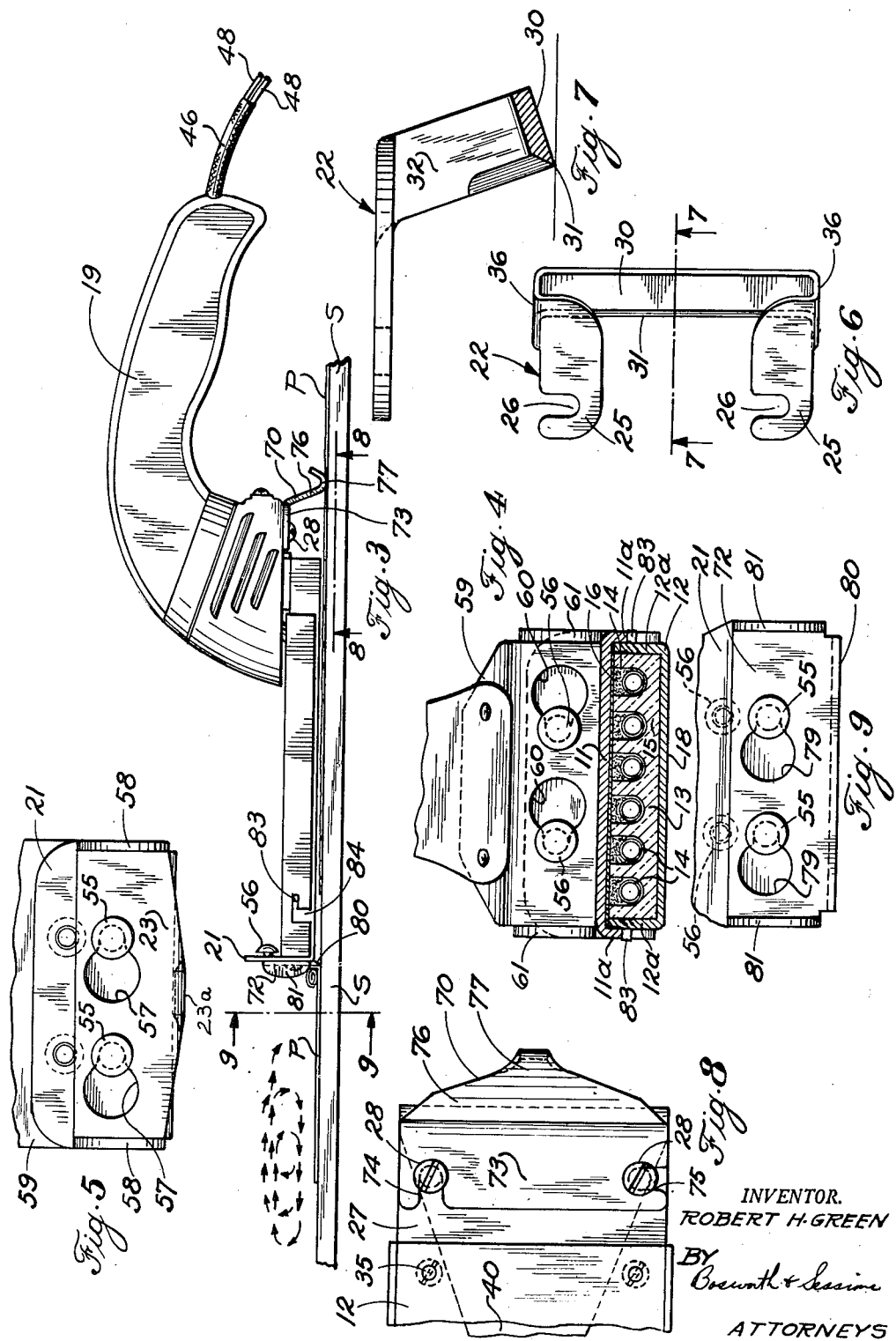

Aug. 10, 1954
R. H. GREEN
2,686,248
PAINT REMOVING TOOL
Filed Oct. 22, 1952
3 Sheets-Sheet 3
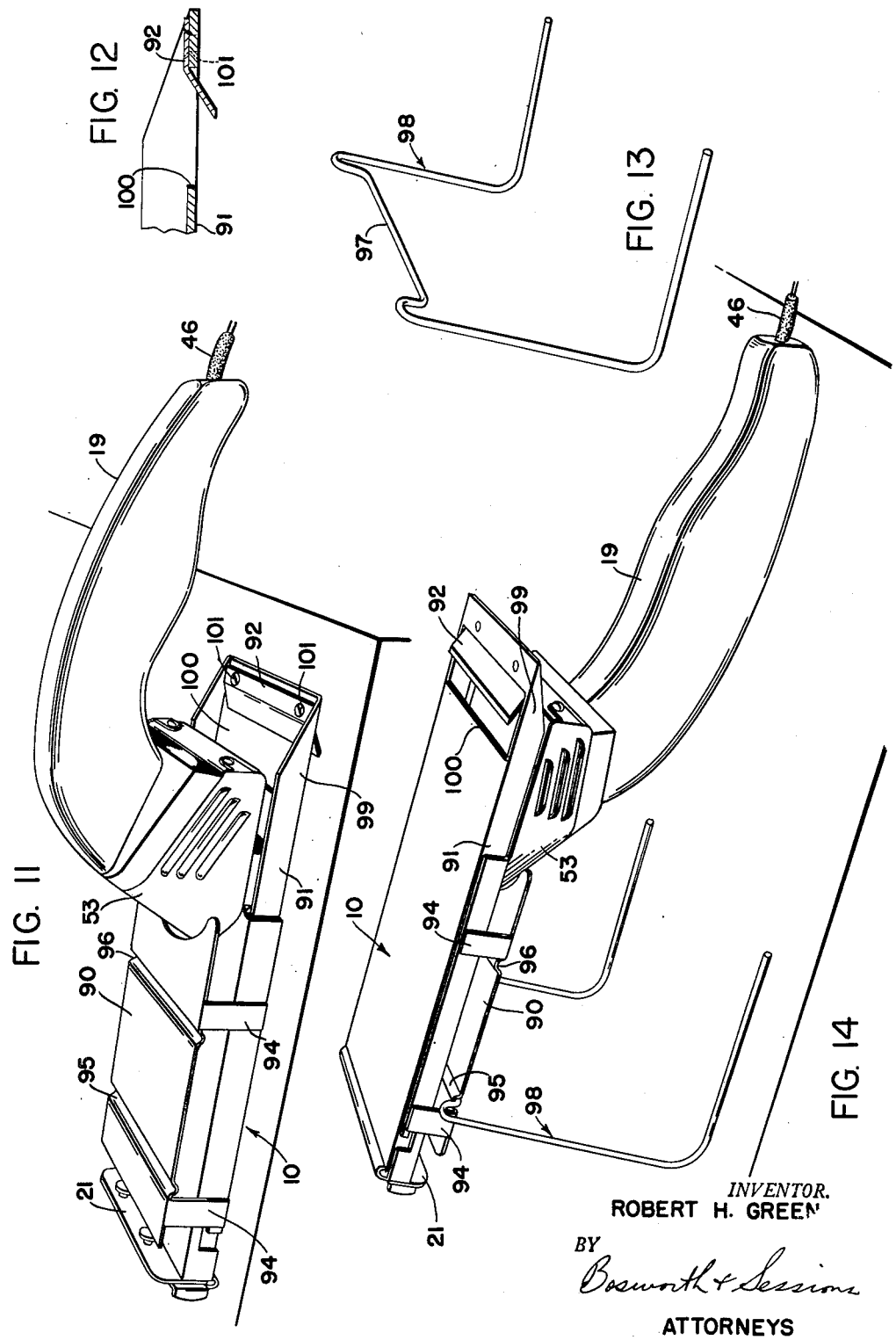
INVENTOR.
ROBERT H. GREEN
BY *Bosworth & Sessions*
ATTORNEYS Patented Aug. 10, 1954

2,686,248

UNITED STATES PATENT OFFICE 2,686,248

PAINT REMOVING TOOL

Robert H. Green, Rocky River, Ohio, assignor to The Otto Konigslow Mfg. Co., Cleveland, Ohio, a corporation of Ohio Application October 22, 1952, Serial No. 316,249

5 Claims. (Cl. 219—29)

This invention relates to tools for removing paint, and more particularly to an electrically heated hand tool for use in scraping paint and the like from wood or metal surfaces.

A general object of the invention is the provision of an electrically heated paint removing tool, capable of faster and more efficient operation than tools heretofore available. Another object is the provision of an electrically heated paint removing tool in which the scraping action can take place at either the front or the rear of the tool so that the tool can be moved with either an intermittent forward and backward motion or with a continuously forward motion in carrying out the scraping operations.

Other objects of the invention include the provision of a tool that is made up largely of stamped parts so that it can be produced at reasonable cost; the provision of a tool which can be operated efficiently by unskilled persons; the provision of a tool that is automatically supported in correct position for scraping; the provision of a tool in which the handles are effectively insulated from the heating element; and the provision of a tool that is not subject to clogging or fouling by the paint.

Briefly, a preferred form of tool made according to my invention comprises an electric heating element encased in a metallic channel-shaped enclosure which functions as the main frame of the tool, the lower surface of the enclosure constituting a radiating surface from which heat generated by the heating element is radiated to the painted surface from which it is desired to remove the paint. The radiating surface is spaced from the painted surface by a scraping blade at one end of the heated surface and a slide or support at the other end of the heated surface. Both ends of the tool are arranged to support either a scraping blade or a guide so that the tool can be moved in an orbital forward and rearward motion as described in my copending application Serial No. 135,127 filed December 27, 1949, which issued as Patent No. 2,613,310 on October 7, 1952, when the scraping blade at the front of the heating element is employed, or with a continuous forward movement when the scraping blade at the rear of the heating element is employed. A rearwardly extending handle is mounted at the rear of the heating element and a forwardly extending handle is detachably mounted at the front of the heating element.

Referring now to the drawings, Figure 1 is a perspective view of one form of my invention showing the tool with the scraping blade mounted at the rear, a guide mounted at the front and with the front handle in place; Figure 2 is an elevation of the tool shown in Figure 1, with parts in section, and illustrating somewhat diagrammatically the scraping action of the tool; Figure 3 is a side elevation of the tool but showing the forward handle removed, the forward guide replaced by a scraping blade and the rear scraping blade replaced by a rear guide; Figure 4 is a transverse section taken along the line 4—4 of Figure 2; Figure 5 is a front end view as indicated by the line 5—5 of Figure 2; Figure 6 is a top plan view of the rear scraping blade removed from the tool, the view being on an enlarged scale; Figure 7 is a section through the rear scraping blade as indicated by the line 7—7 of Figure 6; Figure 8 is a fragmentary bottom view showing the rear guide in position and taken as indicated by line 8—8 of Figure 3; Figure 9 is a front end view as indicated by line 9—9 of Figure 3, showing the front scraping blade; Figure 10 is a sectional detail on an enlarged scale taken on line 10—10 of Figure 2; Figure 11 is a perspective view of a tool embodying a modified form of my invention; Figure 12 is an enlarged fragmentary longitudinal section of the rear base portion of the tool shown in Figure 11; Figure 13 is a perspective view of a stand for the tool, and Figure 14 is a perspective view showing the modified tool in an inverted position on the stand.

Referring particularly to Figures 1, 2 and 4 of the drawings, one form of tool embodying my invention comprises a main body portion indicated in general at 10 and made up of an upper channel section member 11 and a lower channel section member 12. Members 11 and 12 face oppositely and their flanges 11a and 12a are telescoped together to provide a chamber within which an electric resistance heating element 13 is disposed; the heating element preferably comprises heating coils 14 embedded within ceramic insulating material 15. The heating element rests on the lower channel 12 and may be separated from the upper channel 11 by a sheet 16 of asbestos paper or like insulating material. Heat generated by the heating element is transmitted through the lower channel member 12 and radiated from the bottom surface 18 thereof to the surface from which the paint is to be removed.

A handle 19 is mounted on the body 10 and extends rearwardly therefrom, and a handle 20 is detachably secured to the upwardly extending flange 21 formed integrally with the forward end of the channel member 12. When the handle 20 is in place as shown in Figures 1 and 2, the scraping action is preferably carried out by means of a scraping blade 22 disposed at the rear of the body 10 while the forward end of the body is supported by a guide 23, which is also detachably mounted on flange 21. As indicated in Figure 2, the scraping blade 22 and guide 23 support the body 10 in such manner that the radiating surface 18 is spaced slightly above the paint film P that is to be removed from the surface S. The lower part of guide 23 tapers to a supporting or guiding edge 23a of reduced width; this construction facilitating guiding of the scraper on uneven surfaces. The spacing is accomplished by disposing the edge of the scraper below the bottom surface 18 by a distance slightly greater than the thickness of the uual paint film and disposing the work-engaging portion of the guide substantially the same distance below surface 18. In practice, satisfactory operation is obtained with the scraping edge and guide projecting about $\frac{1}{16}$ to $\frac{1}{8}$ inch below the bottom surface 18. This arrangement prevents the hot surface 18 from coming into direct contact with the paint and reduces the change of burning the paint film or the underlying material and prevents the surface 18 from being fouled by paint; at the same time the surface 18 is disposed close to the paint film, thus insuring efficient operation of the tool.

In order to provide a non-clogging scraper, I preferably construct scraper blade 22 as illustrated in Figures 6 and 7 of the drawings. The blade 22 comprises a pair of horizontal supporting portions 25 which are slotted as at 26 and adapted to be clamped to the U-shaped bracket 27 (see Figure 2) by screws 28. The scraping edge proper of the scraper 22 is provided by a transverse portion 30 having a sharpened scraping edge 31. Transverse portion 30 is supported from the horizontal portions 25 by vertical portions 32, the entire scraper 22 preferably being formed integrally from a single piece of metal. Transverse portion 30 is inclined to the horizontal as shown so that when the tool is in use only the edge 31 contacts with the work.

It will be noted that the construction of the blade provides an open space for the full width of the scraping edge between the rear of the body and other scraping edge (and for a substantial distance above) through which the paint film removed by the edge can pass as indicated diagrammatically in Figure 2. Thus, there is little likelihood of the blade becoming fouled by the paint. The blade is spaced rearwardly from the heating element a sufficient distance that paint scrapings do not collect between the blade and the heating element and thus are not likely to foul the heating element. The result is that a paint film can be scraped from a surface by simply moving the tool continuously in a forward direction at a speed such that the paint becomes adequately softened by the heating element in advance of the scraping edge; the paint is removed in a continuous ribbon of the same width as the edge 31. The forward handle 20 is utilized to guide the tool in this operation.

In order to minimize transmission of heat to the blade 22, the bracket 27, upon which the blade is mounted, is secured to the rear portion of the lower channel member 12 by screws 35 (Figure 2), a block 36 of heat insulating material being interposed between the channel member 12 and the bracket. The heat insulating block 36 is separated from the heating element 13 by the downwardly turned rear flange 37 of the upper channel member 11; flange 37 terminates in a horizontal portion 38 disposed between the block 36 and the upper surface of bottom of channel 12. With this construction, and also because of the form of blade 22, transmission of heat to the transverse portion 30 and scraping edge 31 of the blade is reduced.

In order to prevent the rear handle 19 from becoming overheated, it is mounted on the upper leg 40 of the U-shaped bracket 27 by means of screws 41, a block 42 of heat insulating material being interposed between the handle 19 and leg 40 of bracket 27. In addition a thin spacer 43 of insulating material is interposed between leg 40 of bracket 27 and block 42 to further prevent passage of heat to the handle. Thus, the handle 19 is spaced from the hot body portion of the tool by the U-shaped bracket which is insulated from the body, and furthermore the handle is insulated from the bracket.

Handle 19 is provided with intersecting passageways 44 and 45 through which conductors that supply electric power to the heating element 13 extend. Preferably, a conventional cord 46 is employed through the passageway 44; the terminal conductors 47 of the heating element extend into the enlarged passageway 45 and are spliced to the conductors 48 of cord 46 adjacent the intersection of the two passageways. Within passageway 45, the conductors are supported and enclosed in heat resisting sleeves 49 composed of fiber glass or the like, the sleeve being secured by a metal clip 50 (see Figure 10). Adjacent the heating element 13, the conductors 47 are enclosed in separate ceramic insulators 51 which extend within the sleeves 49. A clip 52 secured to the cord 46 above the clip 50 is larger than passageway 44 and prevents tension exerted on the cord 46 from being transmitted to the terminal conductors 47. In order to protect the terminal conductors 47 in the zone between the insulating block 42 and their point of entrance into the ceramic heating element, I preferably employ a louvered shield 53 composed of light gage metal. Shield 53 is secured to the vertical portion of bracket 27 by screws 54 and has an upper peripheral flange 53a that is clamped between the upper leg 40 of bracket 27 and the insulating block 42.

The forward guide 23 and the handle 20 are supported on the upwardly extending flange 21 at the forward end of channel member 12. As shown in Figures 2, 4 and 5, flange 21 has secured to it rivets 55 and 56 for supporting the guide 23 and handle 20 respectively. The heads of rivets 55 are spaced from the forward side of flange 21 and the guide 23 is provided with keyhole slots 57 so that the guide may be secured to the flange 21 by simply passing the enlarged portions of the keyhole slots over the heads of the rivets and then moving the guide into locking position as shown in Figure 5. End flanges 58 on guide 23 enable it to be grasped readily.

The handle 20 is supported in similar fashion on the rivets 56 on the rear face of the flange 54 as shown in Figure 4, the handle being supported by bracket 59 which is provided with keyhole slots 60 that cooperate with the rivets 56 to detachably secure the bracket in place. End flanges 61 are also provided on bracket 59. Handle 20 is secured to the bracket 59 by means of a pair of plates 62 that are riveted to the bracket with insulating material 63 between the plates and the bracket. The handle is supported upon a tubular stem 65 that has a flattened end portion 66 riveted to the forward end portions of plates 62 with insulating material 67 interposed between the flattened portion 66 of the stem and the plates 62; by this construction the handle 20 is effectively insulated from the heat of the body portion of the tool.

Under some circumstances, particularly where it is desired to work close to corners, a forward scraping edge may be preferred (as shown in Figure 3). To convert the present tool to this type of operation, it is only necessary to loosen the screws 28, remove the blade 22 and substitute the rear guide 70 therefor, and to remove the forward guide 23 and substitute the forward scraper 72 therefor. Preferably, the handle 20 is also removed; the tool then appears as shown in Figure 3 and is adapted for scraping by movement in the orbital path indicated by the arrows, the general movement of the tool being rearward, but the scraping action taking place on the forward strokes so that the scraped paint film is curled up and deflected away from the heating element as indicated diagrammatically in Figure 3 and as described in greater detail in my aforesaid copending application.

As shown in Figures 3 and 8, rear guide 70 comprises a simple stamping having a horizontal portion 73 provided with slots 74 and 75 for engagement beneath by screws 28, a downwardly and rearwardly extending portion 76 and a curved guiding portion 77 of reduced width to facilitate use on uneven or warped surfaces.

Forward scraping blade 72 (see Figures 2 and 9) is a stamping provided with keyhole slots 79 to engage rivets 55, a beveled scraping edge 80 and end flanges 81 so that the blade can be more readily grasped to be positioned on or removed from the tool.

It will be noted that the lower channel member 12 acts as the principal support for the handles 19 and 20, the scraping blades 22 and 72 and the guides 23 and 70. The upper channel member 11 is removably secured to member 12 at the rear end by the portion 38 which is clamped against member 12 by insulating block 36 and screws 35 as previously described, and at its front end by pins 83 which extend from the side flanges 12a of member 12 into the slots 84 of flanges 11a of member 11. This construction makes it possible to remove channel member 11 from channel member 12 to give access to the heating element 13.

The modified form of my invention shown in Figures 11, 12, 13 and 14 includes a safety shield 90 which extends ahead of the handle 19 and substantially covers the top part of the main body portion 10 of the tool, and a lower channel section member 91 which extends to the rear or rightward as viewed end of the base of the handle and to which a rear cutting blade 92 is detachably secured. In other respects this form of my invention is essentially the same in construction and mode of operation as the tool described above. The shield 90 is secured to and spaced from the upper channel section 11 by legs 94 located on opposite sides of the shield, and extends from a point adjacent the front of shield 53 to a point spaced slightly to the rear of the front flange 21. Thus the shield 90 substantially protectively covers the front part of the base of the tool and prevents contact therewith by the user of the tool. I prefer that transverse grooves 95, 96 be formed fore and aft in the shield 90 to provide alternate recesses for receiving the cross leg 97 of a supporting stand 98 for the tool when same is not in use. As shown in Figure 14, the tool when mounted on the stand is inverted and rests both on the stand 98 and the handle 19.

The rear portion 99 of the lower channel section member 91 preferably extends behind the base of handle 19 and has an opening 100 therein to permit the blade 92 which is detachably secured by screws 101 to the upper surface thereof, to extend therethrough into engagement with the paint surface being scraped. Screws 101 are spaced on either side of the vertical plane of the handle and are conveniently accessible for rapid changing of the blade 92 when desired.

From the foregoing description of preferred forms of my invention, it will be evident that I have provided a compact and efficient paint removing tool which can be adapted to scrape paint with a scraper blade positioned either at the rear of the heated surface or at the forward end of the heated surface. In either mode of operation, the heated surface is supported out of contact with the paint film by the scraper blade and a guide and hence is not likely to be fouled by paint. The scraping blades are so arranged that in either mode of operation, the paint scraped by the device is deflected away from the heated surface of the tool and is prevented from fouling the blades themselves. The handles are insulated from the heated surface so that the tool may be used with comfort by the operator. The tool operates efficiently and rapidly and may be used without requiring any particular degree of skill. Those skilled in the art will appreciate that various changes and modifications can be made in my invention without departing from the spirit and scope thereof. The essential characteristics of the invention are defined in the appended claims.

I claim:

1. A paint removing tool comprising an elongated body having a substantially flat bottom surface, an electric heating element adapted to heat said bottom surface, a horizontally disposed U-shaped bracket secured to said body and projecting rearwardly therefrom, there being a block of heat insulating material interposed between said bracket and said body, a work-engaging member detachably mounted on the lower leg of said bracket, said work-engaging member projecting downwardly and rearwardly from said bracket and having a work-engaging portion projecting a short distance below said bottom surface, a work-engaging member detachably mounted at the front of said body having a work-engaging portion below said bottom surface, one of said members being a scraping blade and the other of said members being a guide, said two members being adapted to support said body with said bottom surface thereof slightly spaced from and substantially parallel to a surface to be scraped, an upwardly and rearwardly extending handle mounted on the upper leg of said bracket, conductors extending through said handle for supply electric current to said heating element, and means adjacent the front of said member for detachably supporting another handle.

2. A paint removing tool comprising an elongated body having a substantially flat bottom surface, an electric heating element adapted to heat said bottom surface, a horizontally disposed U-shaped bracket secured to said body and projecting rearwardly therefrom, there being a block of heat insulating material interposed between said bracket and said body, a work-engaging member detachably mounted on the lower leg of said bracket, said work-engaging member projecting downwardly and rearwardly from said bracket and having a work-engaging portion spaced rearwardly from and projecting a short distance below said bottom surface, an upwardly and rearwardly extending handle mounted on the upper leg of said bracket, conductors extending through said handle for supplying electric current to said heating element and a shield enclosing said conductors where they extend from said handle to said heating element.

3. A paint removing tool comprising an elongated body having a substantially flat bottom surface, an electric heating element adapted to heat said bottom surface, a horizontally disposed U-shaped bracket secured to said body and projecting rearwardly therefrom, there being a block of heat insulating material interposed between said bracket and said body, a scraper detachably mounted on the lower leg of said bracket, said scraper projecting downwardly and rearwardly from said bracket and having a scraping edge spaced rearwardly from and projecting a short distance below said bottom surface, an upwardly and rearwardly extending handle mounted on the upper leg of said bracket, and conductors extending through said handle for supplying electric current to said heating element.

4. An electrically heated paint removing tool comprising an elongated body made up of a pair of oppositely facing channel section members with their flanges telescoped together, the lower of said members providing a substantially flat exterior bottom surface, an electric heating element disposed within said body and adapted to heat said bottom surface, a bracket mounted at the rear end of said body, there being a block of insulating material interposed between said body and said bracket, a scraper supported on said bracket and having a scraping edge spaced from the rear end of said body and projecting a short distance below said bottom surface, the spaces between said rear end of said body and said scraping edge and immediately above said scraping edge being open and unobstructed, the lower of said members having an upwardly extending flange at the front end of said body, a guide removably mounted on said flange and projecting below said bottom surface substantially the same distance as the scraping edge whereby said scraper and said guide are adapted to support said body with said bottom surface thereof slightly spaced from a surface to be scraped, a rear handle supported by said bracket projecting upwardly and rearwardly from said body and a front heat insulated handle detachably mounted on said flange.

5. An electrically heated paint removing tool comprising an elongated body made up of a pair of oppositely facing channel section members with their flanges telescoped together, the lower of said members providing a substantially flat exterior bottom surface, an electric heating element disposed within said body and adapted to heat said bottom surface, the lower of said members at the rear end of said body having an opening therein, a scraper supported on said lower member rearwardly of said opening and having a scraping edge projecting through said opening a short distance below said bottom surface, the lower of said members having an upwardly extending flange at the front end of said body, a guide removably mounted on said flange and projecting below said bottom surface substantially the same distance as the scraping edge whereby said scraper and said guide are adapted to support said body with said bottom surface thereof slightly spaced from a surface to be scraped, a handle projecting upwardly and rearwardly from said body, and a safety shield extending forwardly from said handle to said flange and being spaced from and supported by said body.

References Cited in the file of this patent

UNITED STATES PATENTS

| Number | Name | Date |
| --- | --- | --- |
| 1,534,953 | Hohman | Apr. 21, 1925 |
| 1,789,269 | Beach | Jan. 13, 1931 |
| 1,881,241 | Potensa | Oct. 4, 1932 |
| 2,256,648 | Preisser | Sept. 23, 1941 |
| 2,308,047 | Blakeslee | Jan. 12, 1943 |